(12) United States Patent
Keshavarz et al.

(10) Patent No.: US 12,107,249 B2
(45) Date of Patent: Oct. 1, 2024

(54) NICKEL-HYDROGEN BATTERY CONFIGURATIONS FOR GRID-SCALE ENERGY STORAGE

(71) Applicant: EnerVenue Inc., Fremont, CA (US)

(72) Inventors: Majid Keshavarz, Pleasanton, CA (US); Ge Zu, San Jose, CA (US); Nelson Dichter, Oakland, CA (US); Wenxiao J. Huang, Palo Alto, CA (US)

(73) Assignee: EnerVenue Inc., Fremont, CA (US)

( * ) Notice: Subject to any disclaimer, the term of this patent is extended or adjusted under 35 U.S.C. 154(b) by 12 days.

(21) Appl. No.: 17/898,098

(22) Filed: Aug. 29, 2022

(65) Prior Publication Data
US 2024/0072338 A1 Feb. 29, 2024

(51) Int. Cl.
*H01M 12/06* (2006.01)
*H01M 4/90* (2006.01)
*H01M 50/51* (2021.01)

(52) U.S. Cl.
CPC ....... *H01M 12/065* (2013.01); *H01M 4/9041* (2013.01); *H01M 50/51* (2021.01)

(58) Field of Classification Search
CPC .... H01M 12/06; H01M 12/065; H01M 50/51; H01M 4/9041
See application file for complete search history.

(56) References Cited

U.S. PATENT DOCUMENTS

| | | | |
|---|---|---|---|
| 3,990,910 A | 11/1976 | Giner et al. | |
| 4,098,962 A * | 7/1978 | Dennison | H01M 10/613 429/120 |
| 4,127,703 A | 11/1978 | Holleck et al. | |
| 4,395,469 A | 7/1983 | Fritts et al. | |
| 4,546,054 A | 10/1985 | Carr et al. | |
| 5,752,987 A * | 5/1998 | Yang | H01M 12/08 429/210 |
| 2019/0051907 A1 | 2/2019 | Cui et al. | |
| 2023/0282890 A1* | 9/2023 | Zhu | H01M 10/0468 429/218.2 |

OTHER PUBLICATIONS

International Search Report and Written Opinion for PCT/US2023/072988, dated Dec. 12, 2023, 13 pages.
Chen et al., "Nickel-hydrogen batteries for large-scale energy storage", Proceedings of the National Academy of Sciences, vol. 115, No. 46, Oct. 29, 2018, pp. 11694-11699.

* cited by examiner

*Primary Examiner* — Karie O'Neill Apicella
(74) *Attorney, Agent, or Firm* — Haynes and Boone, LLP

(57) ABSTRACT

In accordance with some embodiments of this disclosure, a metal-hydrogen battery according to embodiments of the present disclosure includes a vessel; a plurality of electrode stacks arranged in the vessel, wherein each electrode stacks of the plurality of electrode stacks includes a plurality of layers of electrodes, the layers of electrodes including alternating cathode electrodes and anode electrodes, the anode electrode being from of a transition metal anode with a catalyst, one or more separators separating the layers of electrodes, and an electrolyte that saturates each of the electrode stacks in the plurality of electrode stacks.

27 Claims, 11 Drawing Sheets

NICKEL-HYDROGEN BATTERY CONFIGURATIONS FOR GRID-SCALE ENERGY STORAGE

TECHNICAL FIELD

This disclosure is generally related to metal-hydrogen batteries, and more particularly to configurations for metal-hydrogen batteries for grid-scale energy storage.

BACKGROUND

For renewable energy resources such as wind and solar to be competitive with traditional fossil fuels, large-scale energy storage systems are needed to mitigate their intrinsic intermittency. To build a large-scale energy storage, the cost and long-term lifetime are the utmost considerations. Currently, pumped-hydroelectric storage dominates the grid energy storage market because it is an inexpensive way to store large quantities of energy over a long period of time (about 50 years), but it is constrained by the lack of suitable sites and the environmental footprint. Other technologies such as compressed air and flywheel energy storage show some different advantages, but their relatively low efficiency and high cost should be significantly improved for grid storage. Rechargeable batteries offer great opportunities to target low-cost, high-capacity and highly reliable systems for large-scale energy storage. Improving the reliability of rechargeable batteries and reducing cost of those batteries has become an important issue to realize a large-scale energy storage.

One of the large contributors to the cost of providing metal-hydrogen batteries is the cost of the vessel that houses the battery. Consequently, there is an interest in providing vessel and battery configurations with fewer parts that decrease the overall costs and simplifies the manufacturing of metal-hydrogen batteries.

SUMMARY

In accordance with some embodiments of this disclosure, a metal-hydrogen battery according to embodiments of the present disclosure includes a vessel; a plurality of electrode stacks arranged in the vessel, wherein each electrode stack of the plurality of electrode stacks includes a plurality of layers of electrodes, the layers of electrodes including alternating cathode electrodes and anode electrodes, the anode electrode being from of a transition metal anode with a catalyst, one or more separators separating the layers of electrodes, and an electrolyte that saturates each of the electrode stacks in the plurality of electrode stacks.

Other embodiments are contemplated and explained herein after.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the disclosure are utilized, and the accompanying drawings of which:

DETAILED DESCRIPTION OF EMBODIMENTS

In the following description, certain specific details are set forth in order to provide a thorough understanding of various embodiments of the disclosure. However, one skilled in the art will understand that the disclosure may be practiced without these details. Moreover, while various embodiments of the disclosure are disclosed herein, many adaptations and modifications may be made within the scope of the disclosure in accordance with the common general knowledge of those skilled in this art. Such modifications include the substitution of known equivalents for any aspect of the disclosure in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Metal-hydrogen batteries can be configured in a number of ways. In each case, the battery itself includes one or more electrode stacks, each with a series of electrodes (alternating layers of cathode material and anode material) separated by electrically isolating separators. The electrode stacks, which are saturated with an electrolyte, are housed in one or more pressure vessels. The electrode stacks can provide arrays of cells (i.e., pairs of cathode and anode electrodes) that can be electrically coupled in series or in parallel. Each electrode stack can be arranged such that the cells formed in the array of electrodes are coupled in parallel. In accordance with embodiments of the present disclosure, pressure vessels that each contain one or more electrode stacks can be housed in a common pressure vessel (CPV).

Figure 1:
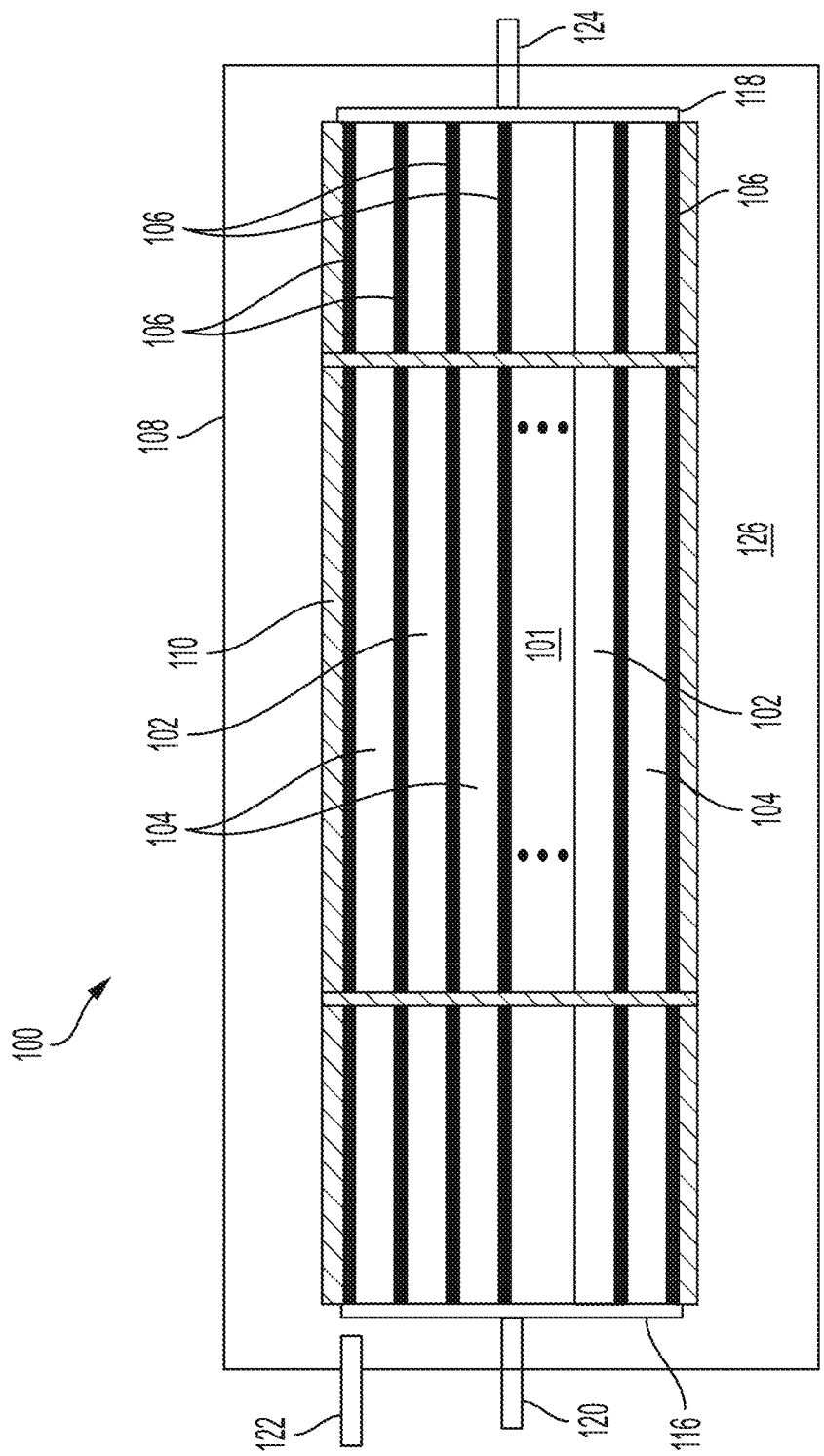
FIG. 1 depicts a schematic of a metal-hydrogen battery according to some embodiments.

FIG. 1 depicts a schematic depiction of an individual pressure vessel (IPV) metal-hydrogen battery 100. The metal-hydrogen battery 100 includes electrode stack assembly 101 that includes stacked electrodes separated by separators 106. The electrodes include cathodes 102, anodes 104. Separator 106 is disposed between the cathode 102 and the anode 104. Each pair of cathode 102 and anode 104 electrodes can be considered a cell. The electrode stack 101 can further include a frame 110 that fixes the cathodes 102, anodes 104, and separators 106 in place. In the particular example illustrated in FIG. 1A, there is an anode 104 on both the top and bottom of stack 101, adjacent to frame 106, however other arrangements can also be formed.

The electrode stack 101 can be housed in a pressure vessel 108. Pressure vessel 108 can contain an electrolyte 126 and hydrogen gas. The cathode 102, the anode 104, and the separator 106 are porous to allow electrolyte 126 to flow between the cathode 102 and the anode 104. Electrode stack 101 is saturated with electrolyte 126. In some embodiments, the separator 106 can be omitted as long as the cathode 102 and the anode 104 can be electrically isolated from each other. For example, the space occupied by the separator 106 may be filled with the electrolyte 126. The metal-hydrogen battery 100 can further include a fill tube 122 configured to introduce electrolyte or gasses (e.g., hydrogen gas) into pressure vessel 108.

As shown in FIG. 1, electrode stack 101 includes a number of stacked layers of alternating cathode 102 and anode 104 separated by a separate 106. Stack 101 includes at least one pair of cathode 102 and anode 104. Cells can be formed by pairs of cathode 102 and anode 104 layers. Although the cells in an electrode stack assembly 101 may be coupled either in parallel or in series, in the example of battery 100 illustrated in FIG. 1A the cells are coupled in parallel. In particular, each of cathodes 102 are coupled to a conductor 118 and each of anodes 104 are coupled to bridge conductor 116. Although FIG. 1A illustrates that fill tube 122 is positioned on the side of anode bridge conductor 116, it may alternatively be placed on the side of cathode bridge conductor 118, or in the side wall of pressure vessel 108. Fill tube 122 may include on or more valves (not shown) or may be otherwise sealed after pressure vessel 108 is charged with operating levels of electrolyte 126.

Additionally, in the example of FIG. 1A, pressure vessel 108 is illustrated as a cylindrical vessel that contains a single electrode stack 101. In accordance with embodiments of the present disclosure, pressure vessel 108 can be any shape large enough to receive multiple electrode stacks 101 and hold the pressures involved during operation. Further, in FIG. 1 electrode stack 101 is illustrated as oriented along a length of pressure vessel 108. However, electrode stack 101 can be arranged so that the electrodes are laterally oriented instead. Consequently, electrode stack 101 can be any shape, have any number of cells, and have any orientation relative to pressure vessel 108.

As is further illustrated in FIG. 1, bridge conductor 116, which is coupled to anodes 104, is electrically coupled to an anode feedthrough terminal 120, which may present the negative terminal of battery 100. Terminal 120 can include a feedthrough to allow terminal 120 to extend outside of pressure vessel 108, or bridge conductor 116 may be connected directly to pressure vessel 102. Similarly, cathode conductor 118, which is coupled to cathodes 102, can be coupled to a cathode feedthrough terminal 124 that represents the positive side of battery 100. Terminal 124 also pass through an insulated feedthrough to allow terminal 124 to extend to the outside of pressure vessel 108.

As discussed above, each cell included in electrode stack 101 includes a cathode 102 and an anode 104 that are separated by separators 106. Electrode stack 101 is positioned in pressure vessel 108 where an electrolyte 126 can flow between cathode 102 and anode 104. As is discussed further below, cathode 102 is formed of a conductive substrate coated by a metal compound. Similarly, anode 104 is formed of a porous conductive substrate coated by a porous catalyst. Separator 106 is a porous insulator that can separate alternating layers of cathode 102 and anode 104 and allow electrolyte 126 to flow between cathode 102 and anode 104. In some embodiments, the electrolyte 126 is an aqueous electrolyte that is alkaline (with a pH greater than 7). Each of anode 104 and cathode 102 can be formed as electrode assemblies with multiply layered structures.

FIG. 1 depicts a schematic of a metal-hydrogen battery 100 that includes an electrode stack 101 that may be included in aspects of the present disclosure. The electrode stack 101 includes at least one layer that includes a cathode 102, an anode 104, and a separator 106 disposed between the cathode 102 and the anode 104. The layer 101 is housed in an enclosure 108. An electrolyte 126 is disposed in the enclosure 108. The cathode 102, the anode 104, and the separator 106 are porous to allow the electrolyte 126 to communicate between the cathode 102 and the anode 104. The metal-hydrogen battery 100 pressure vessel 108 further includes a fill tube 122 configured to exchange hydrogen gas and electrode 126 with the interior of enclosure 108.

As illustrated in FIG. 1 and discussed above, each layer 101 includes one or more layers of a cathode 102 and an anode 104 that are separated by a separator 106. Electrode stack 101 is positioned in a vessel 108 where an electrolyte 126 can flow between cathode(s) 102 and anode(s) 104. As is discussed further below, cathode 102 is formed by one or more material layers each formed of a porous conductive substrate coated by a porous catalyst. Similarly, anode 104 is formed of one or more material layers each formed of a porous conductive substrate coated by a porous catalyst. In some embodiments, the electrolyte 126 is an aqueous electrolyte that is alkaline (with a pH greater than 7). Each of anode 104 and cathode 102 can be formed as electrode assemblies with multiply layered structures.

In accordance with some embodiments, a configuration of battery layers that are all contained within a common vessel is presented. As discussed further below, some embodiments can include Ni—H$_2$ cells that may include nickel-hydroxide cathode, an H$_2$-catalytic anode, and a porous separator saturated in 26% potassium hydroxide all sealed inside of a metal pressure vessel, although other configurations are possible as discussed above. The typical cell design contains many pairs of cathodes and anodes separated by the porous separator and each pair connected in parallel, as is illustrated in FIG. 1. This configuration is referred to as an individual pressure vessel, or IPV, design. The IPV design allows for high energy capacity but achieves only a 1.25 V nominal voltage under typical conditions. The pressure vessel 108 is leak free and capable of withstanding greater than 1000 psi, which is a major cost contributor for Ni—H$_2$ cells.

An embodiment of electrode stack 101 as illustrated above being used in an individual pressure vessel (IPV) configuration is described in more detail in U.S. patent application Ser. No. 17/830,193, entitled "Electrode Stack Assembly for a Metal Hydrogen Battery," filed on Jun. 1, 2022, which is herein incorporated by reference. Another embodiment of electrode stack 101 is described in U.S.

patent application Ser. No. 17/687,527, entitled "Electrode Stack Assembly for a Metal Hydrogen Battery," filed on Mar. 4, 2022, which is also incorporated by reference in its entirety. These and other electrode stacks may be utilized in embodiments of this disclosure as described below.

A common pressure vessel (CPV) as described here is a large format battery, where multiple electrode stacks connected in series or parallel or both are enclosed in a common pressure vessel. Compared to an IPV as illustrated in FIG. 1, or collection of IPVs, with the same energy capacity, a CPV has fewer parts (end caps, feedthroughs, fill ports, busbars, wires, BMS etc.), fewer welds and exhibits lower weight and cost. At the same time, a CPV according to some embodiments of this disclosure usually has better performance than a battery that incorporates individual IPVs to achieve a similar capacity, since the CPV has improved stack to stack connections. In some examples, as is discussed further below, adjacent stacks can be welded together instead of wired, which improves stack-stack electrical connection.

Some embodiments of the present disclosure includes a plurality of stacks 101 as described above arranged in a CPV arrangement. In other words, a battery configuration includes a battery, each battery formed from a plurality of electrode stacks 101, each electrode stack 101 having a number of layers as described above, arranged within a single pressure vessel.

Figure 2A:
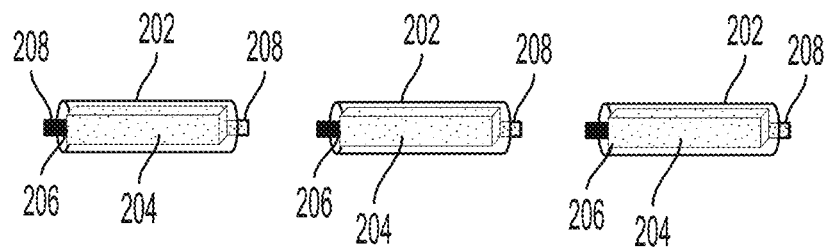
FIGS. 2A through 2G illustrate examples of a common pressure vessel (CPV) battery according to aspects of the present disclosure.
Figure 2B:
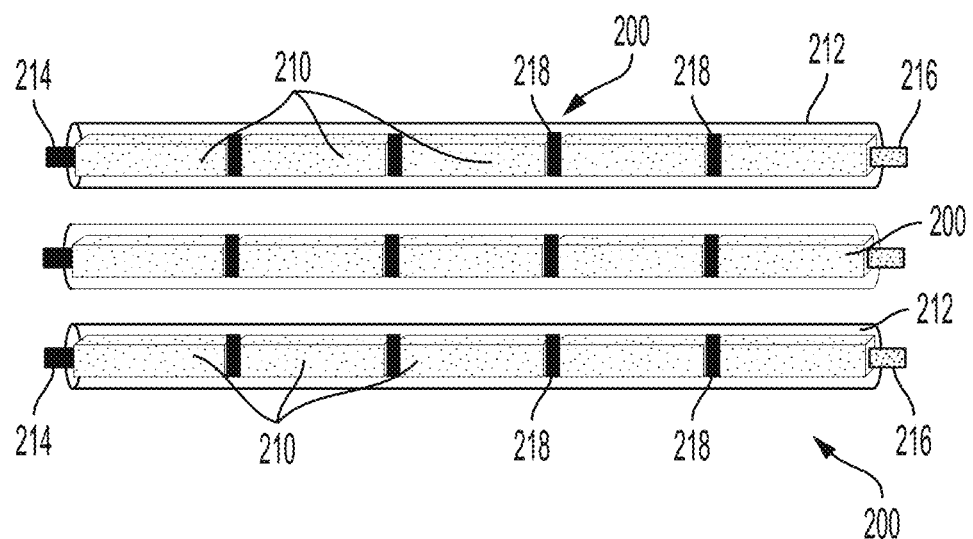

FIGS. 2A and 2B illustrates benefits of a CPV configuration 200 over a configuration of IPV configurations 208 according to some aspects of the present disclosure. FIG. 2A illustrates individual pressure vessels (IPVs) 202, each with a stack 204, to form a battery. Stack 204 can, for example, be an embodiment of stack 101 as illustrated in FIG. 1. Each of stacks 204 is coupled to terminals 206 and 208. As discussed above, IPVs 202 can be connected by terminals 206 and 208 in series or parallel to form a larger battery system. However, each of the IPVs includes its own pressure vessel around each of the stacks.

FIG. 2B illustrates an example of CPV configurations 200. In the example illustrated in FIG. 2B, each of CPV configurations 200 includes a combination of multiple stacks 210 coupled in series and enclosed in a single pressure vessel 212. As is illustrated in FIG. 2B, each CPV configuration 200 includes N stacks 210. Although FIG. 2B illustrates that stacks 210 are coupled in series, some embodiments can include parallel coupled stacks 210.

As is further illustrated in FIG. 2B, each of CPV configurations 200 includes terminals 214 and 216. Stacks 210 can be welded together at welds 218 such that only the end ones of stacks 210 are coupled to one of terminals 214 or 216. Consequently, CPV configurations 200 can include the energy storage of a plurality of individual stacks 210, which are all enclosed within a single pressure vessel 212. Stacks 210 are welded, which provides better electrical and physical connectivity than a similar number of stacks 204. Further, since there is a single pressure vessel, there is only one pair of end caps that enclose the pressure vessel, which reduces the amount of material that is necessary for construction.

FIG. 2B further illustrates a plurality of CPV configurations 200. The plurality of CPV configurations 200 illustrated in FIG. 2B can themselves be electrically coupled in series or in parallel to form a larger battery system.

Figure 2C:
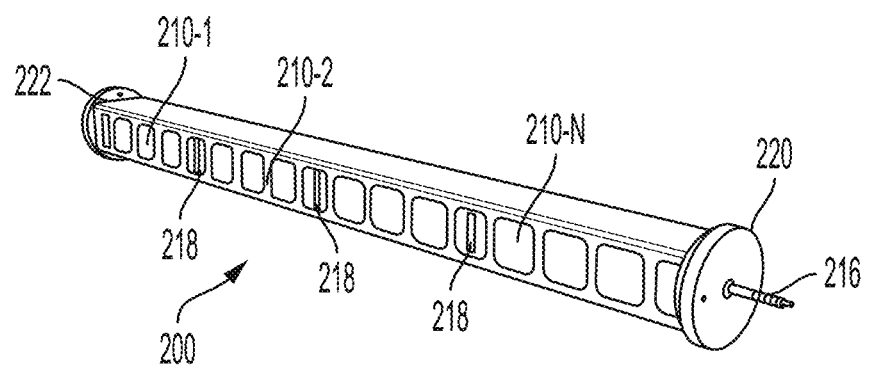

FIG. 2C illustrates an example of CPV configuration 200. CPV configuration 200 includes electrode stacks 210-1 through 210-N coupled between end plates 220 and 222. As is illustrated, electrode stacks 210-1 through 210-N are welded together at welds 218. Electrode 216 extends through end plate 220, for example with a feedthrough, and connected with electrode stack 210-N. Similarly, terminal rod 214 (FIG. 2B) extends through end plate 222, for example through a feedthrough, and is connected to electrode stack 210-1. In some embodiments, a vessel wall can be connected by end plates 222 and 220 to form a pressure vessel 212. In the configuration illustrated in FIG. 2C, communication of electrolyte and hydrogen can occur between CPV configuration 200 and its environment unless a separate pressure vessel wall is included between end plates 220 and 222. In some embodiments, a covering can be provided between plates 220 and 222 that allows hydrogen transport but not electrolyte transport between CPV configuration 200 and its environments.

Figure 2D:
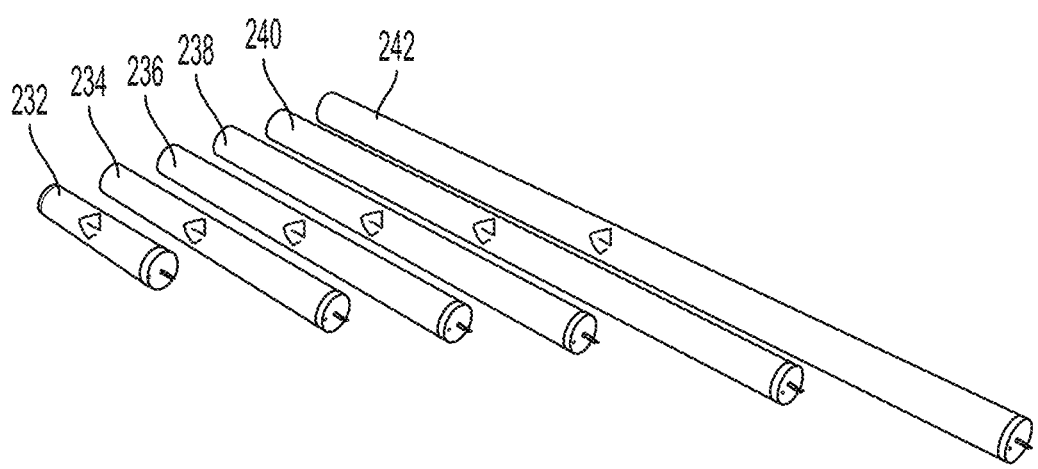

FIG. 2D illustrates relative sizes of various embodiments of CPV configurations 200 with different values of N (i.e. numbers of electrode stacks 210): CPV configuration 232, for example, includes two (2) stacks 210 (N=2); CPV configuration 234 can include four (4) stacks 210 (N=4); CPV configuration 236 can include five (5) stacks 210 (N=5); CPV configuration 238 can include six (6) stacks 210 (N=6); Configuration 240 can include seven (7) stacks 210 (N=7); and Configuration 242 can include eight (8) stacks 210 (N=8). As is illustrated, CPV configuration 200 is sized according to the number of stacks 210 that are included.

Figures 2E, 2F:
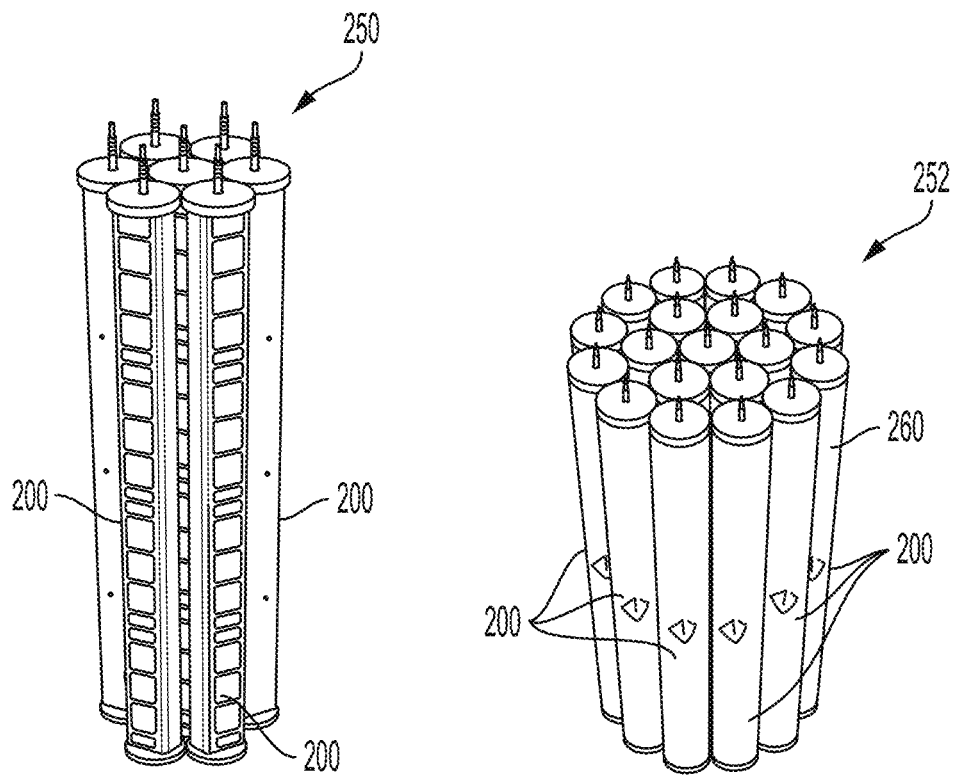
Figure 2G:
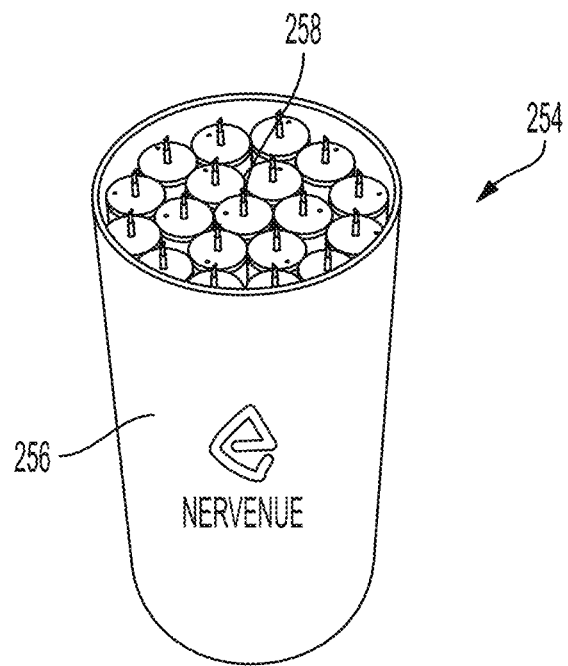

FIGS. 2E, 2F, and 2G illustrate examples of an arrangement of CPV configurations 200. FIG. 2E illustrates a parallel arrangement 250 of CPV configurations 200 as is illustrated in FIG. 2C. FIG. 2F illustrates another parallel arrangement 252 of CPV configurations 200, where each of the CPV configurations 200 is enclosed in a covering 260 that allows transport of hydrogen but may contain electrolyte. FIG. 2G illustrates an arrangement 254 with a parallel arrangement 258 of CPV configurations 200 enclosed in a barrel pressure vessel 256. Parallel arrangement 258 can, for example, be arrangement 252 illustrated in FIG. 2E or arrangement 258 as illustrated in FIG. 2F. Barrel pressure vessel 256 can then form a common pressure vessel for parallel arrangement 258.

FIG. 3A through FIG. 3K illustrate an embodiment of battery 632 according to some embodiments of the present disclosure. In particular, a plurality of electrode stacks 101 as illustrated in FIG. 1 are electrically coupled in series and housed in a pressure vessel 634 to form battery 632 (see FIG. 6E). In particular, each of electrode stacks 101 includes bridge conductors that are easily welded to corresponding bridge conductors of an adjacent electrode stack 101 when the stacks 101 have been aligned. These bridge conductors between adjacent stacks 101 work as bipolar plates (i.e. the anode bridge of one stack is connected to the cathode bridge of the adjacent stack). FIGS. 3A through 3K illustrate embodiments where electrode stacks 200 are embodiments of electrode stack 101 illustrated in FIG. 1, although other stack arrangements can be used.

Figure 3A:
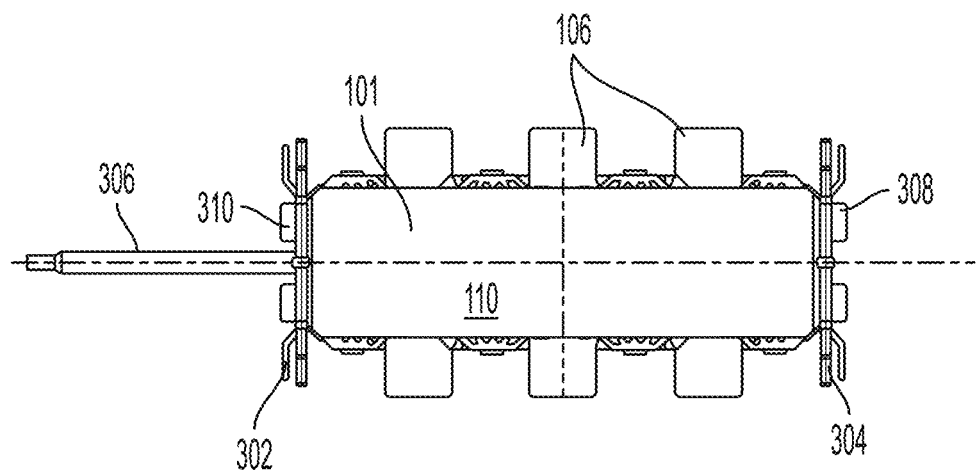
FIGS. 3A and 3B illustrate an example of an electrode stack that can be used in embodiments of the present disclosure.

FIG. 3A illustrates an electrode stack 101 such as that described above with respect to FIG. 1. Electrode stack 101 can be, for example, electrode stack 200 as illustrated in FIGS. 2B-2F. As illustrated in FIGS. 3A and 1, electrode stack 101 is formed by alternating layers of anode 104 and cathode 102 separated by separators 106, all held in a frame 110. In the embodiment illustrated in FIG. 3A each of separators 106 includes wick tabs that, when engaged with the inner wall of a pressure vessel, wicks any electrolyte 126 back into electrode stack 101. This design greatly improved electrolyte recovery and re-distribution among components inside the stack, thus enhanced the longevity of the CPVs formed with electrode stacks 101. Anode conductor 116 and cathode conductor 118 are each formed of bridge conductors 302 and 304 illustrated in FIG. 3A. In the example shown in FIG. 3A, a terminal 306 is connected to bridge conductor 302. Bridge conductor 304 may be connected to bridge conductor 302 of an adjacent electrode stack 101.

As is further illustrated in FIG. 3A, each of anodes 104 and cathodes 102 includes tabs, tabs 308 and 310 are illustrated in FIG. 3A. One of tabs 308 and 310 are part of anodes 104 and the other is part of cathodes 102. Tabs 308 and 310 are connected to bridge conductors 304 and 302, respectively. Bridge conductors 302 and 304 can be coupled to bridge conductors of adjacent electrode stacks 101 or may be coupled to a terminal rod such as terminal 306 as illustrated in FIG. 3A to form a stack arrangement.

Figure 3B:
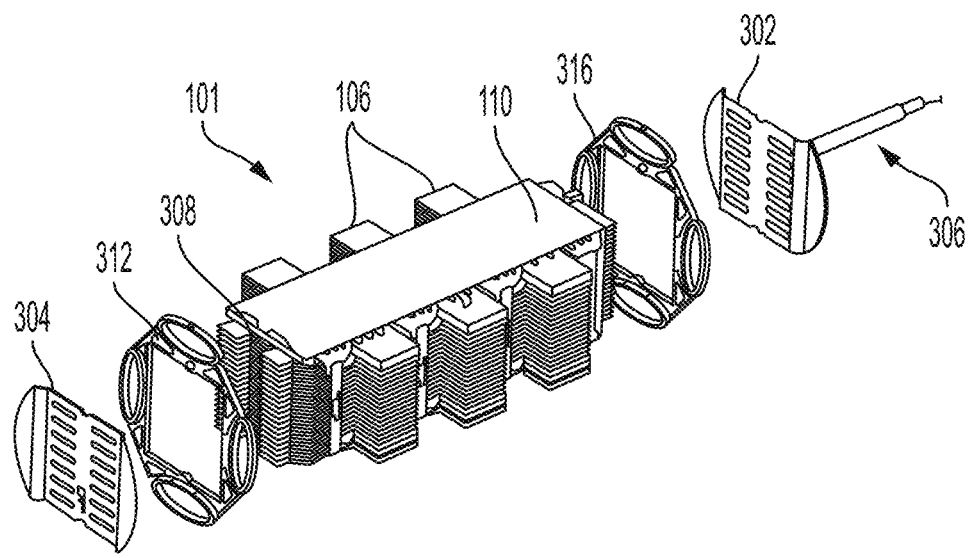

FIG. 3B illustrates a blow-out of the example electrode stack 101 illustrated in FIG. 3A. An isolator 312 is mechanically attached to frame 110 of electrode stack 101. Bridge conductor 304 can be mechanically attached to isolator 312. Tabs 308 of electrode stack 101 are connected to bridge conductor 304. Isolator 316 is attached to frame 110 and bridge conductor 302 is connected to isolator 316.

Figure 3C:
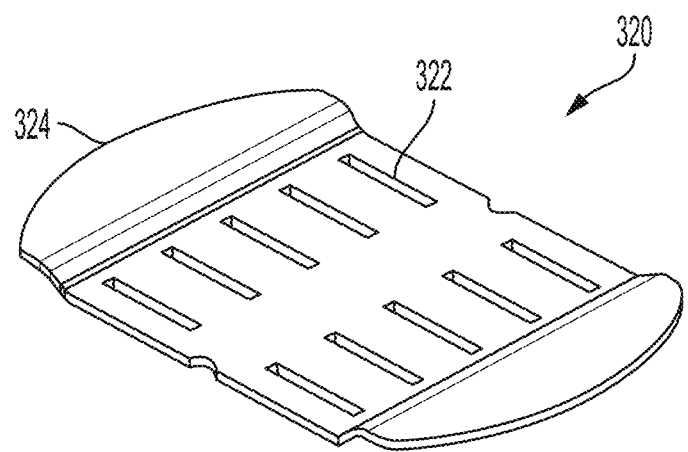
FIG. 3C illustrates a bridge conductor plate of the example electrode stack illustrated in FIGS. 3A and 3B.

FIG. 3C illustrates a bridge conductor 320, which is an example of one of bridge conductor 304 or bridge conductor 302. In the example embodiment illustrated here, bridge conductor 320 includes a bridge frame 324 that is configured to mate with isolator 312 or isolator 316. Additionally, bridge frame 324 is configured to be mechanically connected (e.g., welded) to bridge frames 324 of adjacent ones of electrode stacks 101 or to a terminal rod such as terminal rod 306 as illustrated in FIG. 3A. In some embodiments, bridge frame 324 is formed to stack against other bridge frames 324.

In the embodiment of bridge conductor 320 illustrated in FIG. 3C, slots 322 are formed in bridge conductor 320. Slots 322 are configured to accept tabs 308 or 310. In some embodiments, slots 322 can have the same arrangement in bridge conductor 302 and bridge conductor 304. In some embodiments, slots 322 can be different for anode electrodes and cathode electrodes.

Figure 3D:
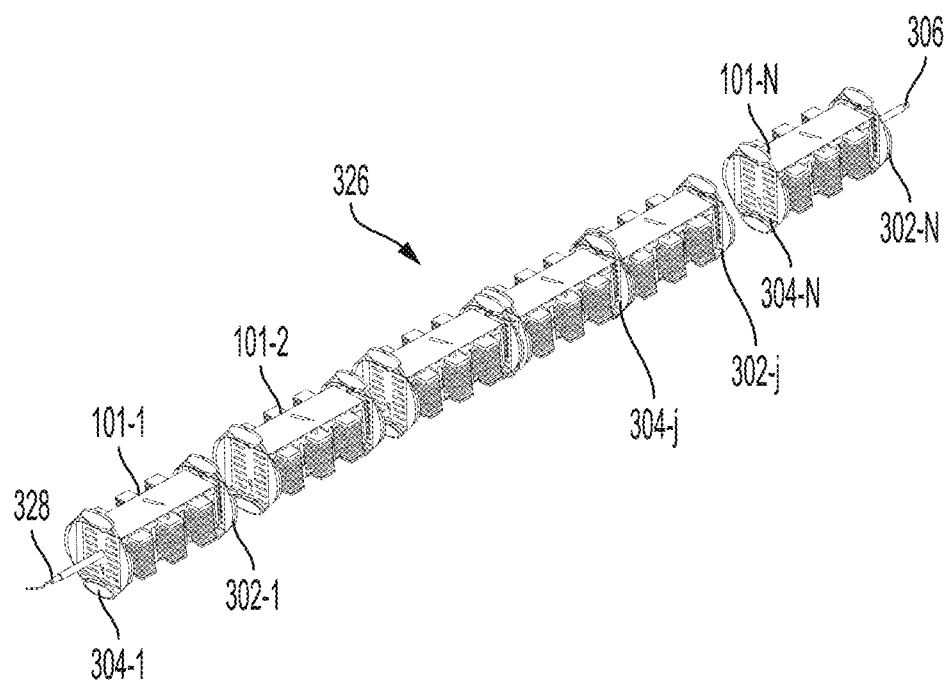
FIG. 3D illustrates assembly of a plurality of electrode stacks as illustrated in FIGS. 3A and 3B.

FIG. 3D illustrates alignment of N electrode stacks 101 (electrode stacks 101-1 through 101-N) according to some embodiments of the present disclosure. As illustrated in FIG. 3D, electrode stacks 101-1 through 101-N are arranged to be coupled in series to form stack arrangement 326, with the anode of one of electrode stacks 101 being coupled to the cathode of an adjacent electrode stack 101. Bridge 304-1 is coupled to a terminal rod 328. Bridge 302-N is coupled to a terminal rod 306.

Figure 3E:
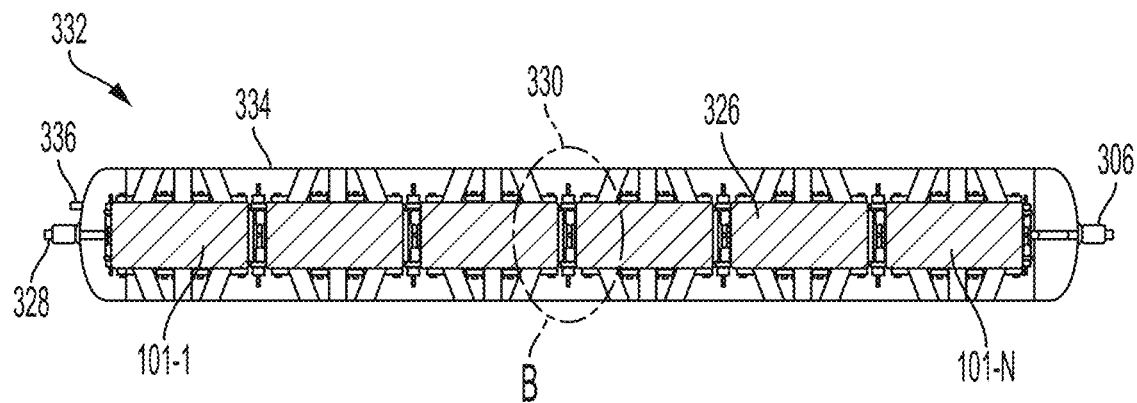
FIGS. 3E and 3F illustrate welding of the plurality of electrode stacks as illustrated in FIGS. 3A and 3B.

FIG. 3E illustrates an assembled battery 332 according to some embodiments. As is illustrated, stack arrangement 326, after connecting each of electrode stacks 101-1 through 101-N in series, is enclosed in a pressure vessel 334 to form battery 332. Terminals 328 and 306 extend through pressure vessel 334, for example with feedthroughs. A fill tube 336 is provided to charge pressure vessel 334 with hydrogen and electrolyte for operation. Electrode stacks 101-1 through 101-N are coupled at bridges conductor 304 and 302 of each of electrode stacks 101-1 through 101-N.

Figure 3F:
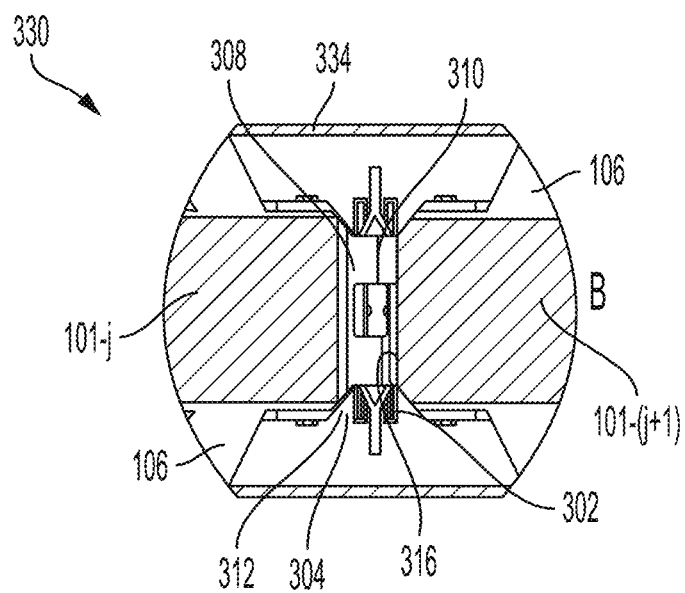

FIG. 3F illustrates the connection between a random adjacent pair of electrode stacks 101, electrode stack 101-$j$ and electrode stack 101-($j$+1) at connection in area 330 illustrated in FIG. 3E. As is illustrated in FIG. 3F, bridge conductor 304 of electrode stack 101-$j$ is coupled to bridge conductor 302 of electrode stack 101-($j$+1). In particular, tabs 308 of electrode stack 101-$j$ and tabs 310 of electrode stack-($j$+1) are coupled and welded to both bridge conductors 304 and 302.

Figure 3G:
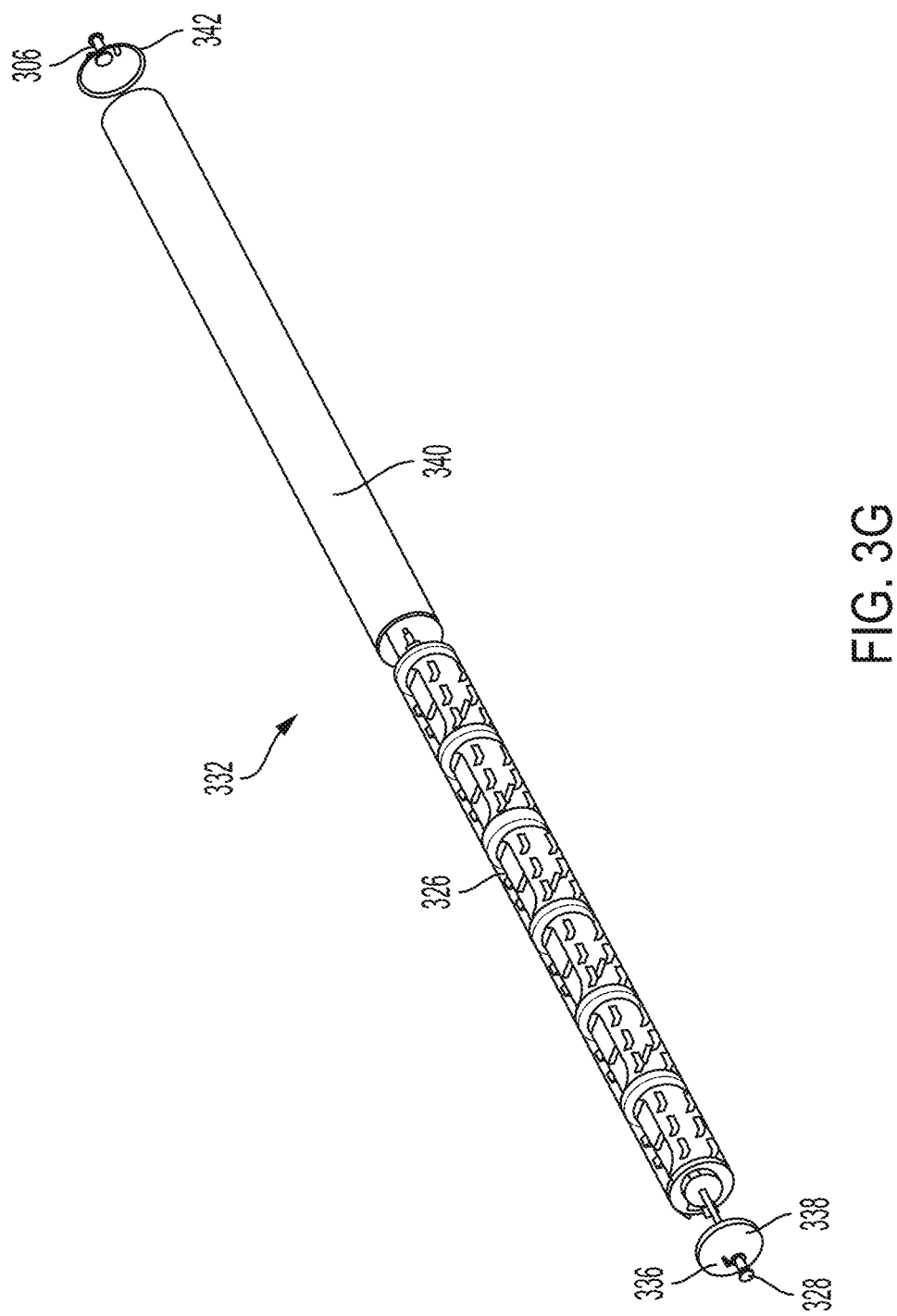
FIGS. 3G and 3H illustrate assembly of a battery using the plurality of electrode stacks as illustrated in FIGS. 3D through 3F.
Figure 3H:
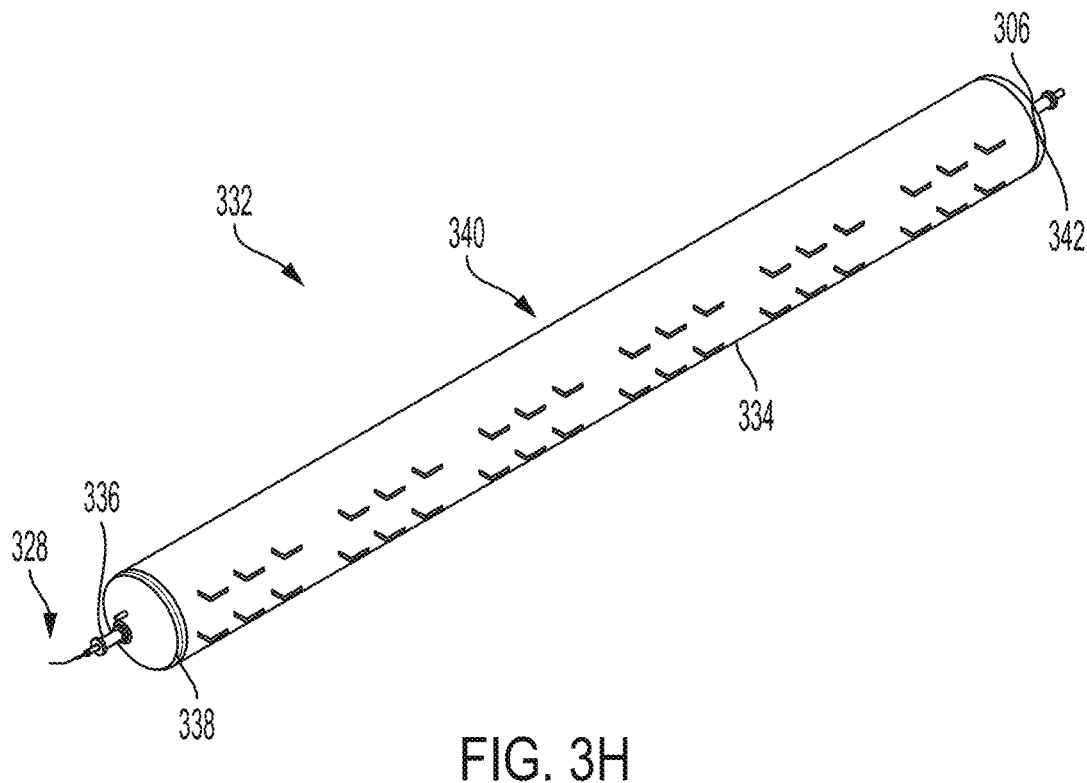

FIG. 3G illustrates an example formation of CPV battery 332. As is illustrated, CPV battery 332 includes a cylindrical portion 340 and two end portions 338 and 342. As is illustrated in FIG. 3G, electrode stack assembly 326 is positioned within cylindrical portion 340 and end caps 338 and 342 are mechanically attached to form battery 332. FIG. 3H illustrates the assembled battery 332.

The electrode stack configurations illustrated in FIGS. 3A through 3H can be used in any of the configurations illustrated in FIGS. 2A through 2G. In the configurations illustrated in FIGS. 2A through 2G, configurations 200 can include electrode stacks 101 as illustrated in FIGS. 3A through 3H.

Figure 3I:
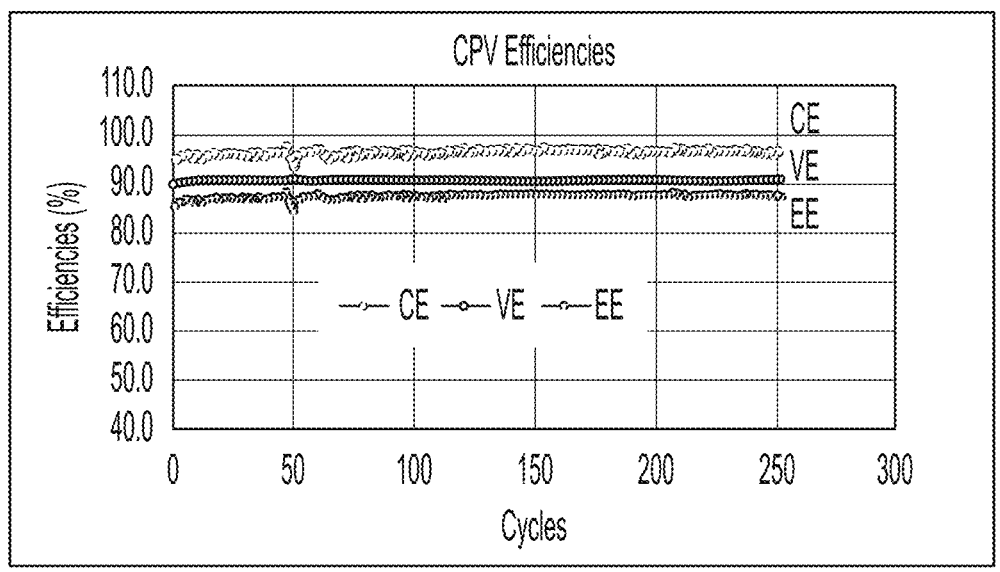
FIGS. 3I, 3J, 3K, and 3L illustrate performance characteristics of the battery illustrated in FIGS. 3G and 3H.

FIG. 3I illustrates efficiencies as a function of cycles for a CPV battery according to some embodiments of battery 332 with N=6 series coupled electrode stacks 101 according to some embodiments of the present disclosure. In particular, FIG. 3I illustrates the Coulomb efficiency (CE), voltage efficiency (VE) and energy efficiency (EE) as a function of cycles. FIG. 3I illustrates excellent stability (no noticeable efficiencies decay for more than 250 cycles) in operation of a battery with multiple electrode stacks 101 according to some embodiments.

Figure 3J:
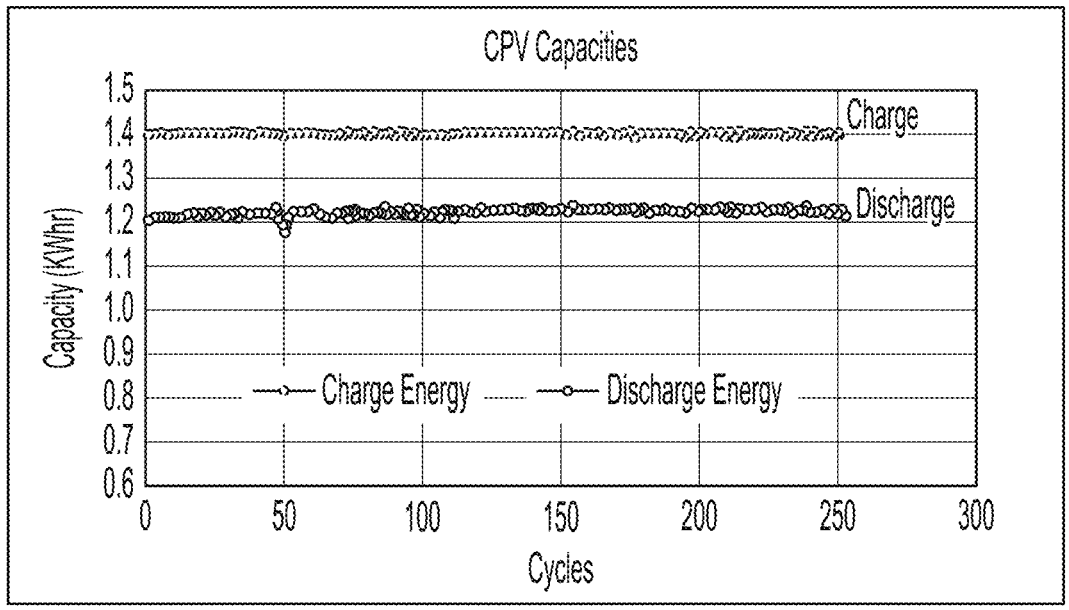

FIG. 3J illustrates charge/discharge capacity as a function of cycles for an embodiment of battery 332 with N=6 series coupled electrode stacks 101 according to some embodiments of the present disclosure. FIG. 3J further illustrates excellent stability (no noticeable capacity decay for more than 250 cycles) in operation of a battery with multiple electrode stacks 101 according to some embodiments.

Figure 3K:
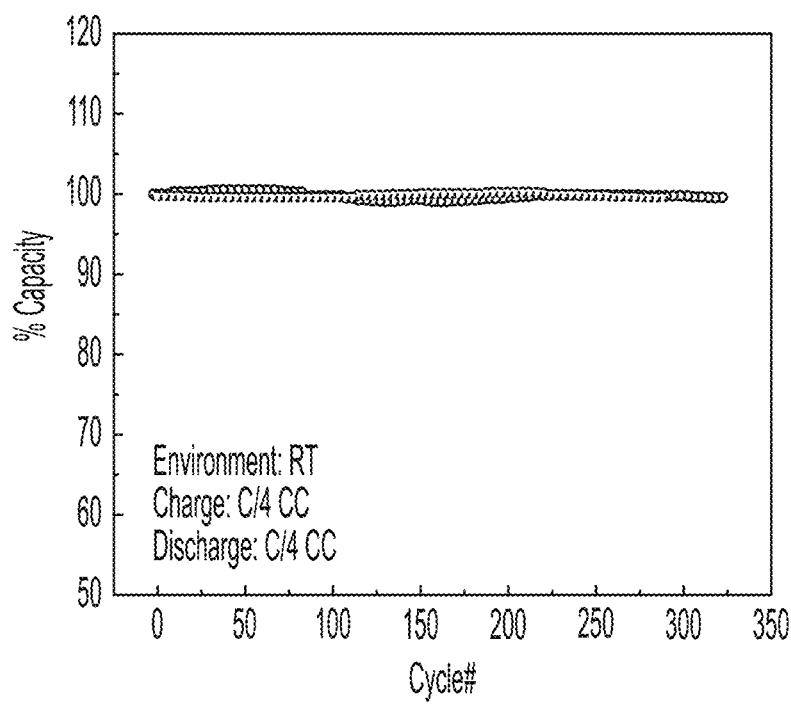

FIG. 3K illustrates battery capacity retention as a function of cycles for two separate CPV batteries according to embodiments of the present disclosure with N=6 series coupled electrode stacks 101 according to some embodiments of the present disclosure. As illustrated, charge and discharge were performed with constant current 40A (C/4). As is illustrated, both batteries exhibit near identical performance over about 300 cycles without losing any capacities, further illustrating the stability of batteries according to some embodiments of the present disclosure.

Figure 3L:
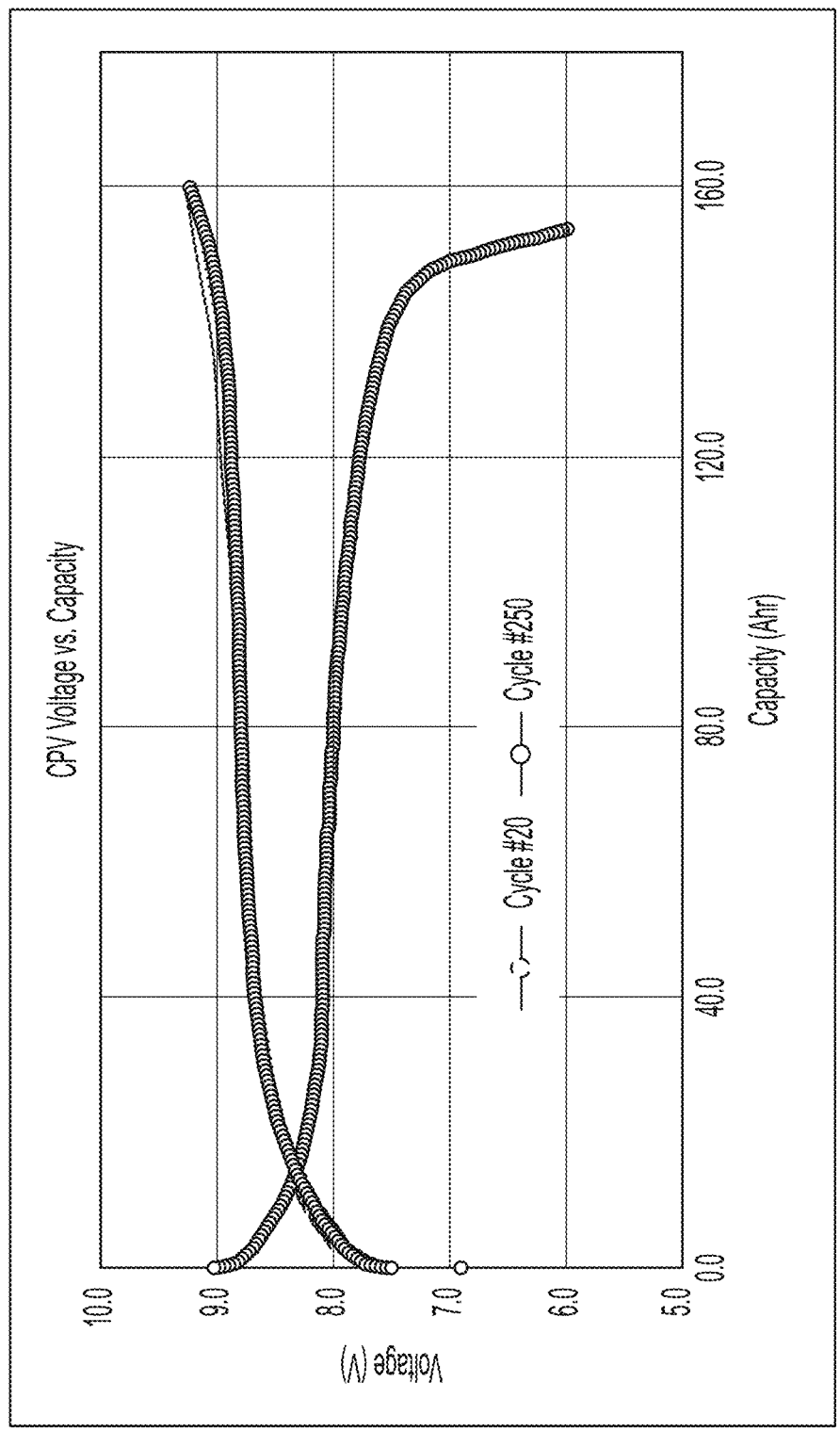

FIG. 3L illustrates voltage versus capacity curves for a CPV battery 332 with N=6 series coupled electrode stacks 101 according to some embodiments of the present disclosure. The charge discharge curve of 20th cycles and 250th cycles overlayed. As is illustrated, there is little difference between the two curves further indicating stability of batteries according to some embodiments of the present disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A metal-hydrogen battery, comprising:
a vessel;

a plurality of electrode stacks arranged in the vessel, wherein each electrode stack of the plurality of electrode stacks includes a plurality of electrodes, the plurality of electrodes including cathode electrodes and anode electrodes that are alternately layered to form a plurality of cells, the anode electrodes of the plurality of layers of electrodes being formed of a transition metal anode with a catalyst, each cell of the plurality of cells including one anode electrode and one cathode electrode of the plurality of electrodes, one or more separators separating the layers of electrodes in the plurality of electrodes, and an electrolyte that saturates each of the electrode stacks in the plurality of electrode stacks, an anode bridge coupled to all of the anode electrodes in the plurality of electrodes, a cathode bridge coupled to all of the cathode electrodes in the plurality of electrodes;

wherein the plurality of electrode stacks are electrically coupled to each other by coupling the anode bridge and the cathode bridge of each of the plurality of electrode stacks within the vessel.

2. The metal-hydrogen battery of claim 1, wherein the catalyst is a nickel-molybdenum-cobalt alloy.

3. The metal hydrogen battery of claim 1, wherein the electrolyte is KOH.

4. The metal hydrogen battery of claim 1, wherein the plurality of plurality of electrode stacks are electrically coupled in parallel with each other.

5. The metal hydrogen battery of claim 1, wherein the plurality electrode stacks is arranged in a planar fashion with respect to each other in the vessel.

6. The metal hydrogen battery of claim 1, wherein the plurality of electrode stacks is arranged to form an assembly.

7. The metal hydrogen battery of claim 1, wherein the plurality of electrode stacks is electrically coupled in series.

8. The metal hydrogen battery of claim 1, wherein the plurality of electrode stacks are arranged in series such that an anode bridge conductor of a first electrode stack is coupled to a cathode bridge conductor of a second electrode stack.

9. The metal hydrogen battery of claim 1, wherein the metal hydrogen battery is coupled with one or more other metal hydrogen batteries.

10. The metal hydrogen battery of claim 9, wherein the metal hydrogen battery is coupled in series with the one or more other metal hydrogen batteries.

11. The metal hydrogen battery of claim 9, wherein the metal hydrogen battery is coupled in parallel with the one or more other metal hydrogen batteries.

12. The metal hydrogen of claim 9, wherein the metal hydrogen battery and the one or more other metal hydrogen batteries are enclosed in a barrel pressure vessel.

13. The metal hydrogen battery of claim 12, wherein the vessel is a covering that allows for hydrogen exchange between the metal hydrogen battery and the one or more other metal hydrogen batteries enclosed in the barrel pressure vessel.

14. The metal hydrogen battery of claim 1 wherein the vessel is a pressure vessel.

15. A method of providing a metal hydrogen battery, comprising:

assembling a plurality of electrode stacks, wherein each electrode stack of the plurality of electrode stacks includes a plurality of electrodes, the plurality of electrodes including cathode electrodes and anode electrodes that are alternately layered to form a plurality of cells, the anode electrodes of the plurality of layers of electrodes being formed of a transition metal anode with a catalyst, each cell of the plurality of cells including an anode electrode and a cathode electrode, one or more separators separating the layers of electrodes in the plurality of electrodes, an anode bridge coupled to all of the anode electrodes in the plurality of electrodes, and a cathode bridge coupled to all of the cathode electrodes in the plurality of electrodes;

coupling the plurality of electrode stacks by electrically connecting the anode bridges and the cathode bridges of each of the plurality of electrode stacks;

inserting the coupled plurality of electrode stacks into a pressure vessel; and charging the pressure vessel with an electrolyte that saturates each of the electrode stacks in the plurality of electrode stacks.

16. The method of claim 15, wherein the catalyst is a nickel-molybdenum-cobalt alloy.

17. The method of claim 15, wherein the electrolyte is KOH.

18. The method of claim 15, wherein coupling the plurality of electrode stacks includes coupling each of the anode bridges of the plurality of electrode stacks and coupling each of the cathode bridges of each of the plurality of electrode stacks so that the plurality of electrode stacks is electrically coupled in parallel.

19. The method of claim 15, further includes arranging the plurality electrode stacks in a planar fashion.

20. The method of claim 15, wherein coupling the plurality of electrode stacks includes connecting the plurality of electrode stacks in series by connecting the anode bridge of a first of the plurality of electrode stacks to the cathode bridge of a second of the plurality of electrode stacks.

21. The method of claim 20, wherein coupling the plurality of electrode stacks in series includes welding adjacent ones of the plurality of electrode stacks such that anode bridges are welded to cathode bridges of adjacent ones of the plurality of electrode stacks.

22. The method of claim 15, wherein coupling the plurality of electrode stacks includes coupling the anode bridge conductor of a first of the plurality of electrode stacks to the cathode bridge conductor of a second of the plurality of electrode stacks that is adjacent to the first electrode stack to form a series coupled metal hydrogen battery.

23. The method of claim 15, further including coupling the metal hydrogen battery is coupled with one or more other metal hydrogen batteries.

24. The method of claim 23, wherein coupling the metal hydrogen battery includes coupling the metal hydrogen battery in series with the one or more other metal hydrogen batteries.

25. The method of claim 23, wherein coupling the metal hydrogen battery includes coupling the metal hydrogen battery in parallel with the one or more other metal hydrogen batteries.

26. The method of claim 23, further including enclosing the metal hydrogen battery and the one or more other metal hydrogen batteries in a barrel pressure vessel.

27. The method of claim 26, wherein the vessel is a covering that allows for hydrogen exchange between the metal hydrogen battery and the one or more other metal hydrogen batteries enclosed in the barrel pressure vessel.

\* \* \* \* \*